Figure 1:
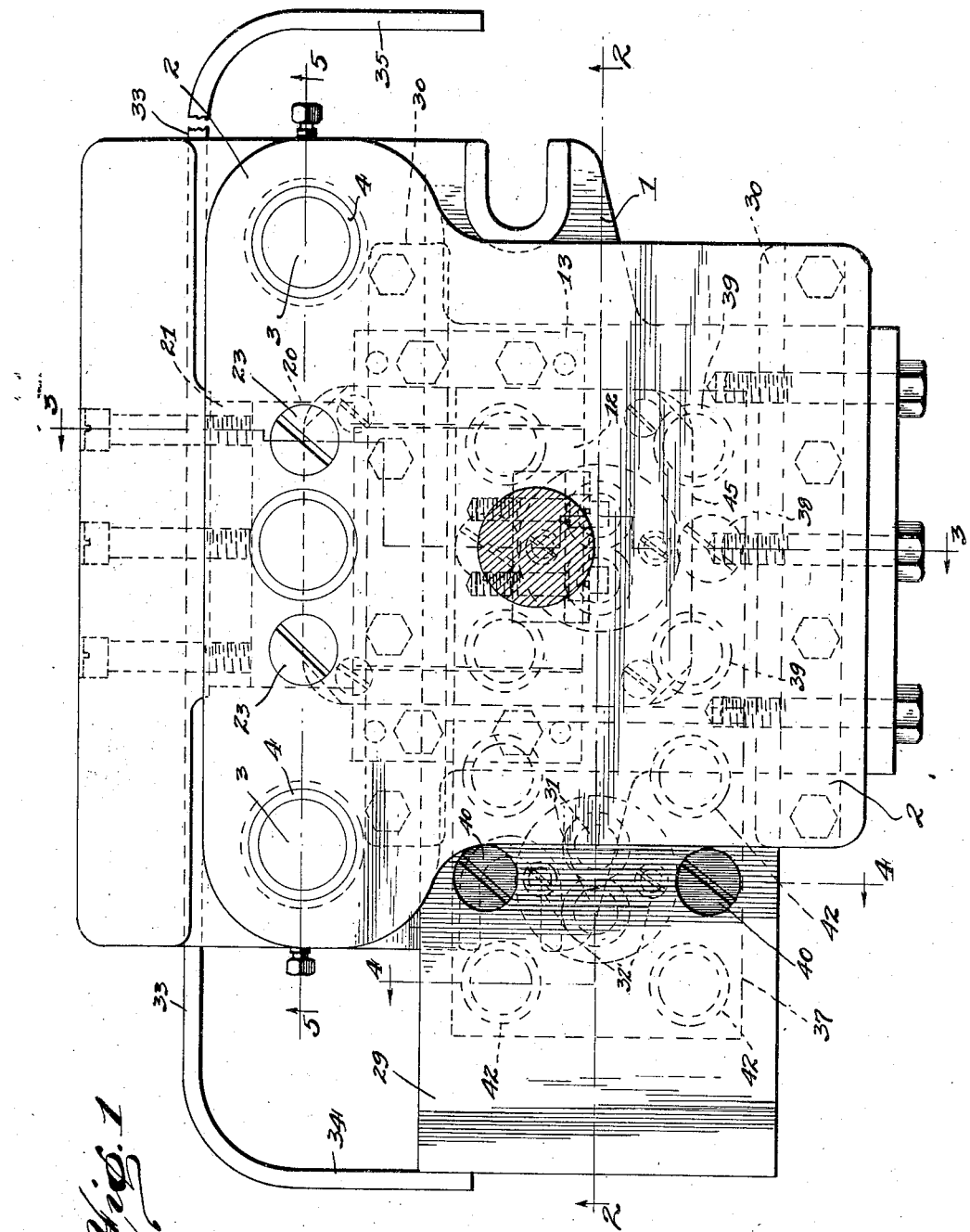
Figure 2:
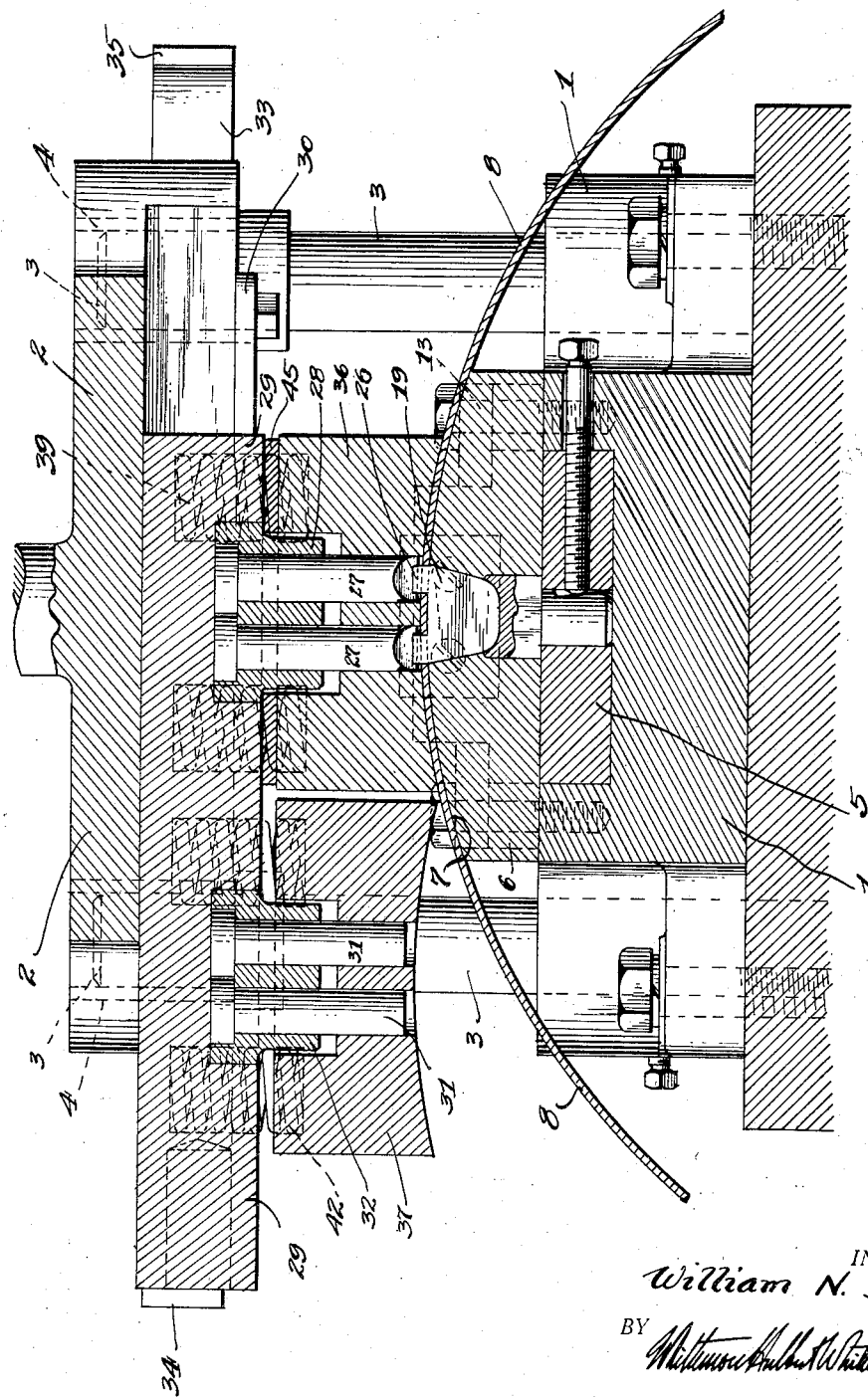
Figure 3:
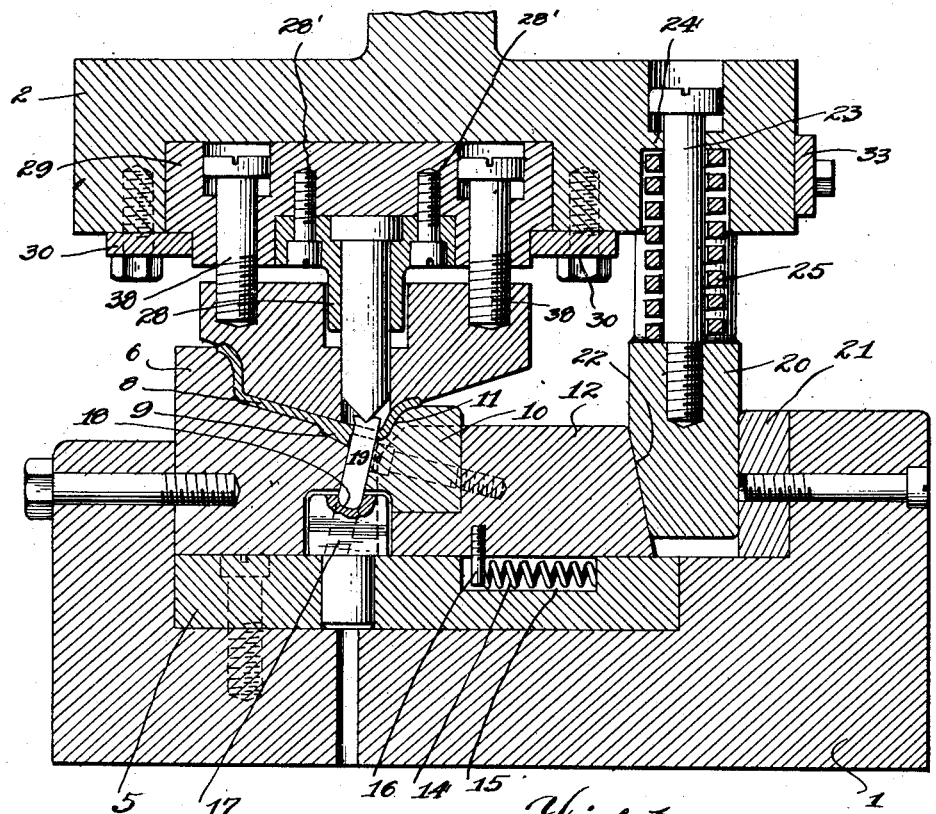
Figure 4:
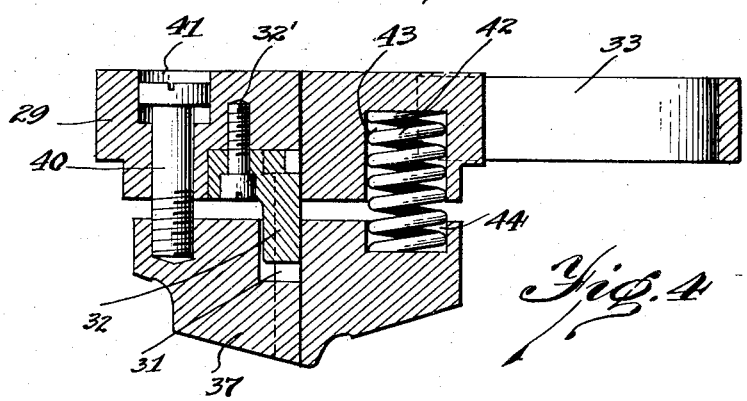
Figure 5:
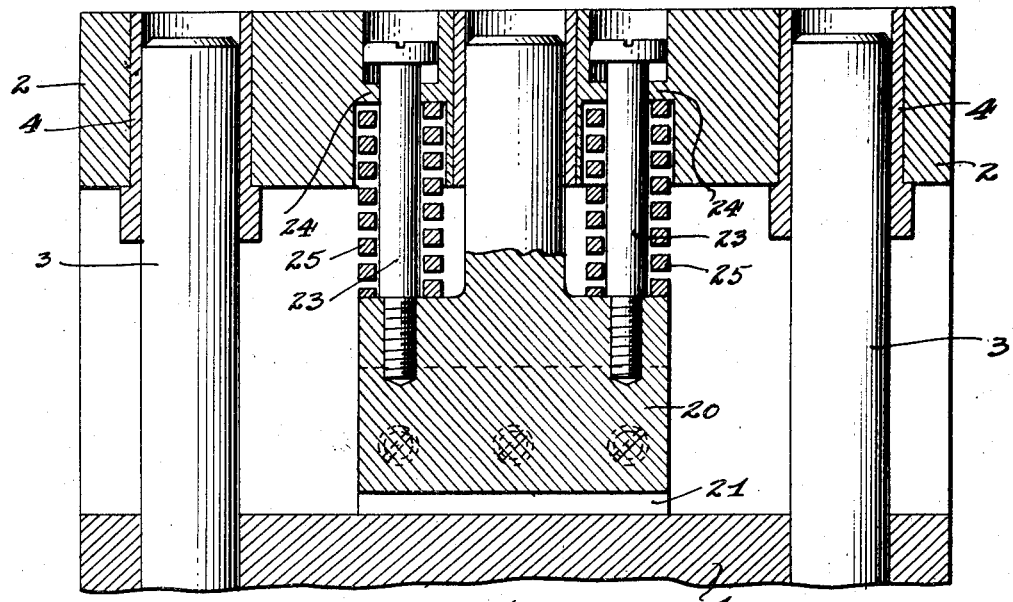

Sept. 29, 1931.  W. N. BOOTH  1,825,175
MACHINE FOR RIVETING LUGS TO A TIRE CARRYING RIM
Filed June 1, 1926   4 Sheets-Sheet 1

INVENTOR.
William N. Booth.
BY
ATTORNEYS.

Sept. 29, 1931.   W. N. BOOTH   1,825,175
MACHINE FOR RIVETING LUGS TO A TIRE CARRYING RIM
Filed June 1, 1926   4 Sheets-Sheet 2

INVENTOR.
William N. Booth
BY
ATTORNEYS.

Sept. 29, 1931.  W. N. BOOTH  1,825,175
MACHINE FOR RIVETING LUGS TO A TIRE CARRYING RIM
Filed June 1, 1926  4 Sheets-Sheet 3

INVENTOR.
William N. Booth
BY
ATTORNEYS.

Sept. 29, 1931.  W. N. BOOTH  1,825,175
MACHINE FOR RIVETING LUGS TO A TIRE CARRYING RIM
Filed June 1, 1926  4 Sheets-Sheet 4

INVENTOR.
William N. Booth
BY
ATTORNEYS.

Patented Sept. 29, 1931

1,825,175

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

MACHINE FOR RIVETING LUGS TO A TIRE CARRYING RIM

Application filed June 1, 1926. Serial No. 112,961.

The invention relates to machines for riveting lugs to a tire carrying rim and has for one of its objects the provision of an improved machine which is so arranged that the rivets of the lugs may be both split and riveted down. Another object is to provide a machine in which the splitting and riveting punches are carried by a slide which is movable relative to a holder to register either the splitting or the riveting punches with the rivets of a lug. A further object is to provide a machine which prior to the operation of either the splitting or riveting punches clamps a lug rigidly in place.

With these as well as other objects in view, the invention resides in the novel features of construction and combinations and arrangements of parts as more fully hereinafter set forth.

In the drawings:—

Figure 6:
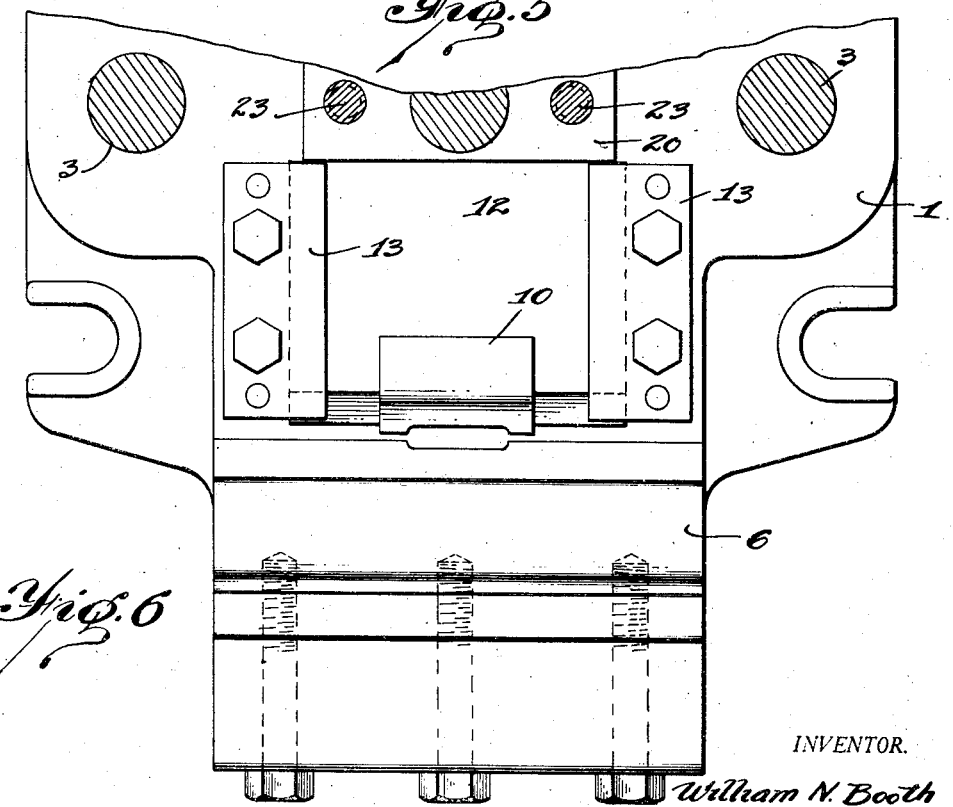

Figure 1 is a plan view of a machine with the rim omitted;

Figures 2, 3, 4 and 5 are cross sections, respectively, on the lines 2—2, 3—3, 4—4 and 5—5 of Figure 1;

Figure 6 is a plan view of the die shoe and associated parts.

In riveting clamping lugs to a demountable tire carrying rim it has been usual heretofore to pass the rivets of the lugs through the apertures punched in the base of a rim and to then split the rivets of each lug in one machine, after which the rim with the lugs having split rivets is removed from this machine and the split rivets are riveted down in another machine. With my machine, both the splitting and the riveting down of the rivets of each lug are accomplished in the one position of the rim and lug so that a material saving in time may be effected.

1 is the die shoe which is suitably mounted upon the bed of a punch press or the like and 2 is a holder which is suitably secured to the ram of the punch press or the like and is vertically reciprocable toward and away from the die shoe 1, it being guided during this vertical movement by the guide pins 3, the lower ends of which are rigidly secured to the die shoe and the upper ends of which are adapted to slidably extend through suitable bushings 4 in the holder. The die shoe 1 carries a sectional die, the parts of which are so arranged that they support a clamping lug and the adjacent portion of the demountable tire carrying rim. This sectional die is supported upon the block 5, which with the sectional die is located in a recess in the upper face of the die shoe. The sectional die has the stationary die section 6 with an arcuate upper face 7 conforming to the inner face of the demountable rim 8 at the lateral inner side of the bead 9 of this rim. The sectional die also has the movable die section 10 with an arcuate upper face 11 conforming to the inner face of the rim at the lateral outer side of its bead. This movable die section is secured to and carried by the slide 12, which is reciprocably mounted upon the block 5 and guided by the gibs 13. This slide is normally forced laterally toward the rim and clamping lug by means of the coil spring 14 having one end abutting the end of the recess 15 in which the coil spring is located and the other end abutting the pin 16 which is secured to the slide. 17 is an anvil forming part of the sectional die and having a reduced portion mounted in the block 5 and an enlarged upper portion resting upon this block and located between the stationary die section 6 at one side and the movable die section 10 and the slide 12 at the other side. The upper face of this anvil is formed with the recess 18 for conforming to the end portion of the clamping lug 19 and the die sections 6 and 10 are shaped so that when they are supporting the rim they also abut the opposite sides of the lug to clamp the same in place.

For assuring that the movable die section 10 will be in proper position prior to the rivet splitting and riveting down operations, I have provided the cam 20 which is adapted to engage in the space between the slide 12 and the wear block 21 secured to the die shoe, this cam having an end bevelled at 22 to engage the correspondingly bevelled outer end of the slide 12, thereby forcing the slide and the die section 10 laterally toward the rim and lug to firmly clamp the latter against the die section 6 and to also assist in supporting the rim. The angle of inclination of these bevelled surfaces is such that while the cam may move the slide, the latter cannot move the former. This cam is yieldably supported by the holder 2 and as shown 23 are shoulder screws which slidably extend downwardly through the holder and have their lower ends threaded into the cam, the head of these screws being engageable with the upper faces of the cross walls 24, preferably formed integral with the holder and located between its upper and lower faces. 25 are coil springs surrounding the cap screws 23 and having their upper ends engageable with the lower faces of the cross walls 24 and their lower ends engageable with the lower faces of the cam 20, the arrangement being such that the coil springs force the cam 20 into engagement with the slide 12 during the downward movement of the holder 2 and allows the latter to move downwardly after the cam 20 has reached its lowermost position.

To split and rivet down the rivets 26 of each clamping lug 18, I have provided splitting and riveting punches which are movably carried by the holder 2 to successively register with the rivets of the clamping lugs. In detail, 27 are splitting punches having lower bevelled ends for engaging the rivets 26. These punches are carried by the holder 28 which in turn is carried by the slide 29 as by means of the cap screws 28'. This slide is movably supported upon the holder 2 as by means of the gibs 30 so that it may reciprocate above the die shoe 1 in the plane of the rim. 31 are riveting punches which may be engaged with the rivets 26 after they are split to rivet down the same. These riveting punches are carried by the holder 32 as by means of the cap screws 32' which is also supported by the slide 29 and are spaced longitudinally of the slide from the splitting punches. For positioning the slide 29 to register either the splitting or the riveting punches with the rivets 26 of the clamping lugs, I have provided the limit member 33 which is rigidly secured to the holder 2 and is in the nature of a bar. This limit member has at its ends the stops 34 and 35 which are formed by bending the ends of the bar and which extend into the path of travel of the slide 29 to be alternatively engageable with its opposite ends. The stop 34 is so positioned that when the slide 29 is in contact therewith the splitting punches 27 register with the rivets while the stop 35 is so positioned that when the slide is in contact therewith the riveting punches 31 register with the rivets 26.

For clamping the rim firmly against the upper die sections 6 and 10 during the time the rivets are being split and riveted down I provide the clamping rods 36 and 37, each having a lower concave face conforming to the outer face of the rim. These clamping pads are yieldably carried by the slide 29 and have vertical openings therethrough for the passage of the splitting punches 27 and riveting punches 31, respectively, and also recesses in their upper faces for respectively receiving the holders 28 and 32 of these punches. The clamping pad 36 is suspended from the slide 29 by means of the shoulder screws 38 which are located on opposite sides of the punch holder 28 and have their lower ends threaded into the clamping pad and their heads slidably engageable in recesses in the upper face of the slide 29, the arrangement being such that the clamping pad may move vertically relative to the slide. For yieldably forcing the clamping pad downwardly and away from the slide, I have provided the coil springs 39 which extend into registering recesses in the lower and upper faces of the slide and clamping pad preferably at the corners of the latter. The clamping pad 37 is supported in the same manner as by means of the shoulder screws 40 extending downwardly through the slide and threaded at their lower ends into the clamping pad 37, the heads at the upper ends of these screws being slidable in the recesses 41 in the upper face of the slide 29. 42 are coil springs extending into the registering recesses 43 and 44, respectively, in the slide 29 and clamping pad 37 and located preferably at the corners of the latter. With this arrangement it will be seen that the slide 29 may be reciprocated to bring either the splitting or the riveting punches into registration with the rivets of the clamping lug after which the holder 2 may be lowered, carrying with it the slide 29. During this lowering movement either the clamping pad 36 or the clamping pad 37, according to the position of adjustment of the slide 29, comes into contact with that portion of the outer face of the rim 8 above the die sections 6 and 19 securely clamping the same against these die sections, after which the splitting or the riveting punches come into contact with the rivets and operate thereupon, the coil springs between the clamping pads and the slide permitting relative movement after the rim has been clamped.

For the purpose of avoiding bulging of the metal of the rim adjacent to the clamping lugs, the plate or shim 45 may be located between either or both of the clamping pads and the slide, it having a thickness such that during the final movement of either the splitting or riveting punches the clamping pad will also be very slightly moved to more firmly force the rim against the die sections.

What I claim as my invention is:

1. In a machine for riveting a lug to a rim, the combination with a support for a rim and lug with a rivet extending from the lug through the rim, of a holder movable toward and away from said support, punches for alternatively splitting and riveting down the rivet, means movably carried by said holder for carrying said punches, and means movable with said holder during a portion of its movement toward said support for clamping the rim against said support and stationary during the following portion of the movement of said holder toward said support to allow either of said punches to engage the rivet.

2. In a machine for riveting a lug to a rim, the combination with a support for a rim and lug with a rivet extending from the lug through the rim, of a holder movable toward and away from said support, punches for alternatively splitting and riveting down the rivet, a slide movably carried by said holder for holding said punches and clamping means movably carried by said slide and engageable with the rim to clamp the same against said support prior to engagement of said punches with the rivet.

3. In a machine for riveting a lug to a rim, the combination with a support for a rim and lug with a rivet extending from the lug through the rim, of a holder movable toward and away from said support, punches for alternatively splitting and riveting down the rivet, a reciprocable slide carried by said holder and supporting said punches, clamping pads movably supported by said slide and engageable with the rim prior to engagement of said punches with the rivet for clamping the rim against said support, and means tending to yieldably force said clamping pads away from said slide and toward said support, said means permitting movement of said slide toward said support after said clamping pad has engaged the rim.

4. In a machine for riveting a lug to a rim, the combination with a die shoe, of a holder movable toward and away from said shoe, means upon said shoe for supporting the rim and lug with a rivet extending from the lug through said rim, said means including die sections relatively movable in a horizontal direction toward and away from each other for clamping the lug therebetween and for clamping the rim in place, a punch carried by said holder for operating upon the rivet, and means carried by said holder and movable upon actuation of the latter for engaging the punch with the rivet to move said die sections together in clamping relation to said rivet and rim.

5. In a machine for riveting a lug to a rim, the combination with a die shoe, of a holder movable toward and away from said shoe, means for supporting the rim and lug with a rivet extending from the lug through the rim, said means including relatively movable die sections for clamping the lug in place, means carried by said holder for moving one of the die sections into clamping engagement with the lug, and means also carried by said holder for operating upon the rivet.

6. In a machine for riveting a lug to a rim, the combination with a die shoe, of a holder movable toward and away from said shoe, means for supporting a rim and lug with a rivet extending from the lug through said rim, said means including die sections slidably mounted upon said die shoe for clamping the lug in place, a cam carried by said holder for moving one of said die sections into engagement with the lug, and a punch also carried by said holder engageable with the rivet.

7. In a machine for riveting a lug to a rim, the combination with a die shoe, of a holder movable toward and away from said shoe, means upon said shoe for supporting a rim and lug with a rivet extending from the lug through the rim, said means including a stationary die section, a movable die section for cooperating with said stationary die section to clamp the lug in place and a slide connected to said movable die section, a cam yieldably carried by said holder and engageable with said slide to move said movable die section into clamping engagement with the lug, said slide and cam having cooperating bearing faces inclined to permit movement of said slide by said cam and to prevent movement of said cam by said slide, and a punch also carried by said holder for engagement with the rivet.

8. In a machine for riveting a lug to a rim, the combination with a die shoe, of a holder movable toward and away from said shoe, means upon said shoe for supporting the rim and lug with a rivet extending from the lug through the rim, said means including die sections relatively movable toward and away from each other for clamping the lug therebetween and for securing the rim in place, and means actuated by said holder prior to engagement of said punch with the rivet for moving said sections into operative position.

9. In a machine for riveting a lug to a rim, the combination with a die shoe, of means upon said shoe for supporting the rim and lug with a rivet extending from the lug through said rim, said means including relatively movable die sections having portions engageable with opposite sides of the lug for clamping the latter therebetween and having other portions engageable with the rim for securing the same in place, and means for actuating said punch and die sections.

10. In a machine for riveting a lug to a rim, the combination of means for supporting a rim and a lug with a rivet extending from the lug through the rim, said means including die sections relatively movable toward and away from each other for clamping the lug therebetween, means for actuating said sections including, a holder movable toward and away from said supporting means, and a punch carried by the holder and operable during movement thereof toward the supporting means for operating upon said rivet.

11. In a machine for riveting a lug to a rim, the combination of means for supporting a rim and a lug with a rivet extending from the lug through the rim, said means including die sections movable relative to each other and operable in one position to clamp the rim in place, a reciprocable holder movable toward and away from the supporting means, means carried by said holder and movable therewith for actuating the die sections, and a punch also carried by said holder and actuated thereby to operate upon the rivet subsequent to the operation of said die sections to clamp the rim in position.

12. In a machine for riveting a lug to a rim with a rivet extending from the lug through the rim, means including relatively movable die sections engageable with opposite sides of the rivet for clamping the latter therebetween, a reciprocable holder movable toward and away from the die sections, means actuated by the holder for operating the die sections, a punch also actuated by said holder for operating upon the rivet, and means carried by said holder and movable relative thereto for engaging the rim prior to the punching operation to clamp the same in position.

In testimony whereof I affix my signature.

WILLIAM N. BOOTH.